US011857468B2

(12) United States Patent
Zanon

(10) Patent No.: US 11,857,468 B2
(45) Date of Patent: Jan. 2, 2024

(54) FUNERARY CAPSULE FOR VIEWING AND TRANSPORTING DEAD BODIES

(71) Applicant: SHUTTLE INNOVATION DI ERIO ZANON, Quinzano d'Oglio (IT)

(72) Inventor: Erio Zanon, Quinzano d'Oglio (IT)

(73) Assignee: SHUTTLE INNOVATION DI ERIO ZANON, Quinzano d'Oglio (IT)

(*) Notice: Subject to any disclaimer, the term of this patent is extended or adjusted under 35 U.S.C. 154(b) by 38 days.

(21) Appl. No.: 17/598,142

(22) PCT Filed: Mar. 23, 2020

(86) PCT No.: PCT/IT2020/050070
§ 371 (c)(1),
(2) Date: Sep. 24, 2021

(87) PCT Pub. No.: WO2020/194359
PCT Pub. Date: Oct. 1, 2020

(65) Prior Publication Data

US 2022/0175603 A1 Jun. 9, 2022

(30) Foreign Application Priority Data

Mar. 26, 2019 (IT) ........................ 102019000004333

(51) Int. Cl.
*A61G 17/00* (2006.01)
*A61G 17/04* (2006.01)
*A61G 17/007* (2006.01)

(52) U.S. Cl.
CPC ......... *A61G 17/001* (2017.05); *A61G 17/002* (2013.01); *A61G 17/007* (2013.01); *A61G 17/041* (2016.11)

(58) Field of Classification Search
CPC .. A61G 17/001; A61G 17/004; A61G 17/041; A61G 17/06; A61G 17/04;
(Continued)

(56) References Cited

U.S. PATENT DOCUMENTS 274,575 A * 3/1883 Eaton .................. A61G 17/028 27/4
1,261,244 A 4/1918 Kinnison
(Continued)

FOREIGN PATENT DOCUMENTS

EP 2 045 525 4/2009
JP H09299417 11/1997

OTHER PUBLICATIONS

International Search Report for PCT/IT2020/050070 dated Jun. 26, 2020.

(Continued)

*Primary Examiner* — William L Miller
(74) *Attorney, Agent, or Firm* — NIXON & VANDERHYE

(57) ABSTRACT

Disclosed is a funerary capsule for viewing and transporting dead bodies, including: a casket for containing the body, provided with a side wall and with a closing lid; a bag for containing the body, which can be placed in the casket. The casket includes a hinge for the side wall and the lid, adapted to allow the movement thereof by rotation, and where the bag includes handles and closing ties to facilitate insertion of the body into the casket, extraction therefrom and loading thereof into the crematory, wherein the casket includes rotation hinges of pivot type, adapted to allow reversible lifting of the related side wall.

7 Claims, 5 Drawing Sheets

(58) Field of Classification Search

CPC .. A61G 17/002; A61G 17/007; A61G 17/034; A61G 17/042; A61G 17/0136; A61G 17/028; A61G 17/0405

USPC ............................ 27/2, 4, 11, 14, 16, 27, 35

See application file for complete search history.

(56) References Cited

U.S. PATENT DOCUMENTS

| | | | | | |
|---|---|---|---|---|---|
| 3,613,189 | A * | 10/1971 | Kirby | A61G 17/04 | 27/35 |
| 4,177,543 | A * | 12/1979 | Angermann | A61G 17/004 | 27/35 |
| 4,788,757 | A * | 12/1988 | Bethune | A61G 17/0106 | 27/35 |
| 5,924,181 | A * | 7/1999 | Takasugi | A01N 1/00 | 27/11 |
| 6,625,852 | B1 * | 9/2003 | Hanson | A61G 17/04 | 5/105 |
| 6,684,467 | B1 * | 2/2004 | Walker | A61G 17/041 | 27/35 |
| 8,112,851 | B1 | 2/2012 | Hughes | | |
| 8,127,414 | B2 * | 3/2012 | Rankin | A61G 17/041 | 27/35 |
| 8,914,953 | B1 * | 12/2014 | Thacker | A61G 17/0076 | 27/35 |
| 9,138,367 | B2 * | 9/2015 | Thacker | A61G 17/0076 | |
| 9,539,161 | B2 * | 1/2017 | Davis | A61G 17/02 | |
| 9,872,809 | B1 * | 1/2018 | Davis | A61G 17/0076 | |
| 9,889,057 | B1 * | 2/2018 | Womack | A61G 17/041 | |
| 10,596,055 | B1 * | 3/2020 | Fernandez | A61G 17/0136 | |
| 2005/0108863 | A1 * | 5/2005 | Fash | A61G 17/001 | 27/2 |
| 2010/0218351 | A1 * | 9/2010 | Rankin | A61G 17/041 | 27/14 |

OTHER PUBLICATIONS

Written opinion of the ISA for PCT/IT2020/050070 dated Jun. 26, 2020.

* cited by examiner

FIG. 1 *(prior art)*
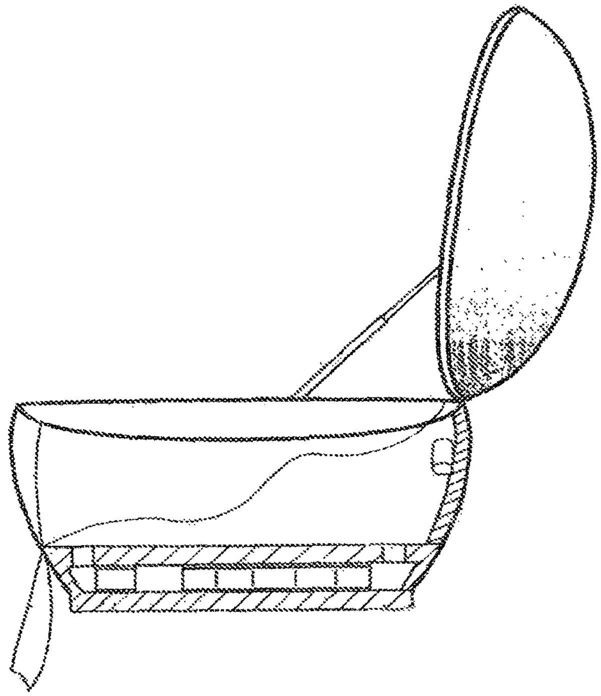
FIG. 2 *(prior art)*
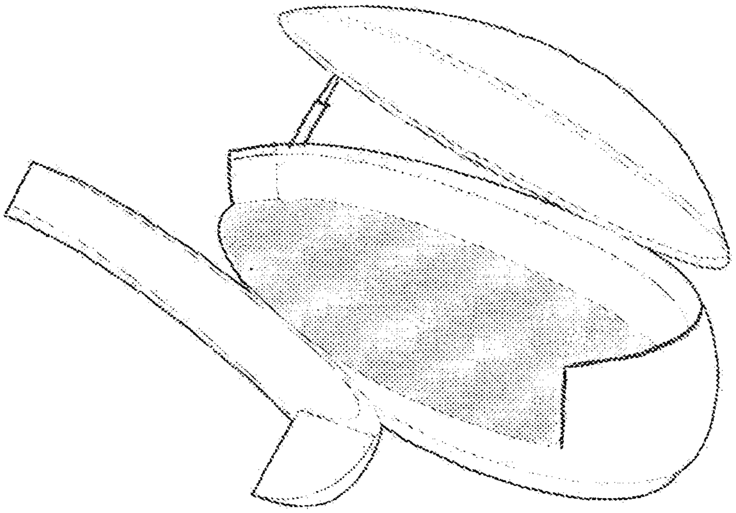

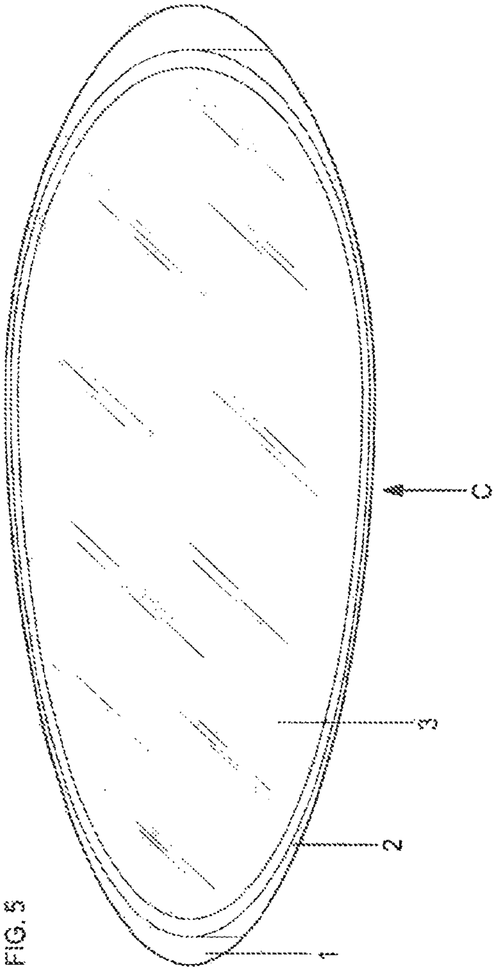
FIG. 5
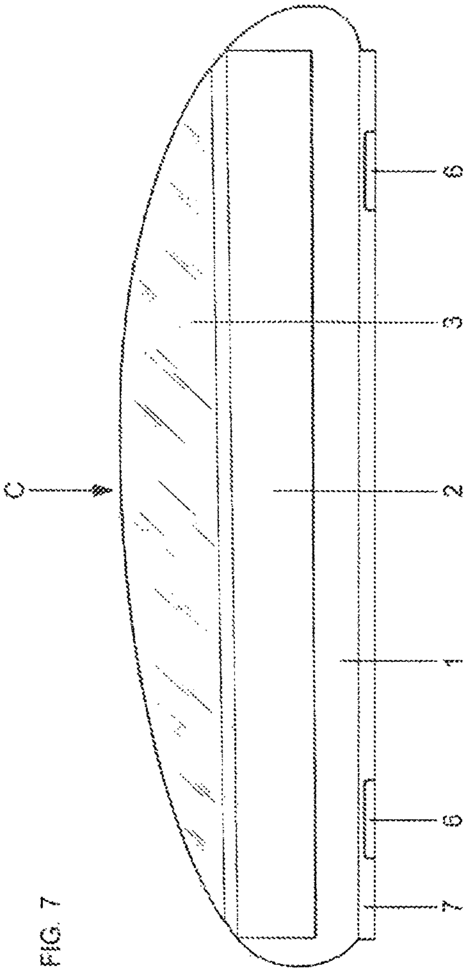
FIG. 7
FIG. 6
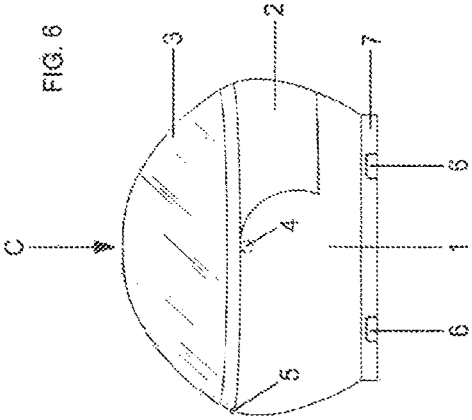

FUNERARY CAPSULE FOR VIEWING AND TRANSPORTING DEAD BODIES

This application is the U.S. national phase of International Application No. PCT/IT2020/050070 filed Mar. 23, 2020 which designated the U.S. and claims priority to IT Patent Application No. 102019000004333 filed Mar. 26, 2019, the entire contents of each of which are hereby incorporated by reference.

TECHNICAL FIELD

The invention relates to the technical field of the funerary industry, with particular reference to viewing, transport, burial and cremation services.

More in detail, the invention concerns a funerary capsule for viewing and transporting dead bodies, which can be reused many times.

BACKGROUND ART

For convenience, hereinafter reference will be made to the practice of cremation as non-limiting example of the use of the funerary capsule according to the invention.

Cremation is an alternative funeral practice to the more traditional burial, consisting in incineration of a dead body in an appropriate crematory, the inner walls of which are heated to temperatures close to 1000° C. by means of electric heating elements, gas burners or a direct flame.

Incineration of the dead body takes place together with a coffin used to contain and transport it, thereby producing the important negative aspects of:

- requiring high energy consumptions, deriving from the need to obtain incineration of the body and of the coffin corresponding to the requirements established by the regulations in this sector;
- emitting harmful gases deriving in particular from incineration of the materials of which the coffin is made (wooden or synthetic materials, varnishes, dyes, glues, etc.);
- requiring high access and operating costs, deriving from the need to use a single-use coffin, specific for the practice of cremation.

The document EP 2 045 525 A2 discloses a funerary cell comprising a coffin and a bag to enclose the body. FIG. 1, extracted from the document cited above, illustrates this prior art, i.e., a coffin comprising a tilting lid and an openable side wall, through which the bag containing the body can be extracted when it is to be inserted into a crematory. Said coffin comprises hinge means with horizontal axis for said lid and said side wall.

FIG. 2, again relating to the prior art cited above, illustrates an axonometric view of the actual open configuration of the coffin.

From the image, it is apparent that, due to the capsule structure of the coffin and to the curved structure of its side wall, this latter can only be fastened to the main body of the coffin by means of a hinge with horizontal axis of limited length, located in the central part of the wall.

The fastening means are thus unfavorably weak and unstable, above all to support the weight of the side wall, and during extraction of the body, which cannot be simply pulled out of the main body of the coffin but must be lifted to avoid placing too much weight on the weak and unstable hinge.

Even more unfavorably, as illustrated in FIG. 2, the ends of the side wall open and tilted downward form an obstruction in front of the coffin which makes it difficult to access the interior, and consequently the body.

Moreover, as is also apparent from FIG. 2, empty spaces are created between the body of the coffin and the open and downward tilting side wall, into which the body can slide and become caught while being moved and extracted, causing evident problems.

PRESENTATION OF THE INVENTION

The object of the invention is to overcome the aforesaid negative aspects.

The object of the invention is achieved with a funerary capsule for viewing and transporting dead bodies, according to the main independent claim 1.

Further features of the invention are described in the dependent claims.

The funerary capsule for viewing and transporting dead bodies, forming the subject of the invention, achieves numerous and important advantages, as:

- it allows viewing of the dead body (in mortuaries, places in which funeral services are held, etc.,) and the subsequent transport thereof to the chosen burial or cremation site;
- it allows management of the body (introduction into and extraction from the capsule, placing in the tomb or loading into the crematory) with limited physical effort by the funeral operators;
- it can be lifted and/or transported with minimum physical effort by the funeral operators, and placed on the ground or on folding supporting legs;
- it can be reused, after suitable sanitation processes, and therefore prevents the high energy consumptions and emissions of harmful gases in the crematory deriving from the incineration of coffins in traditional cremations, and the high operating costs deriving from their single use.

Advantageously, the rotation hinges of pivot type allow reversible lifting of the side wall, leaving the space in front of the casket free so as to facilitate access to and recovery of the body by the operators who must handle it, for example during passage from the funerary capsule to the crematory. Contrary to the prior art, by lifting the side wall upward there is no obstruction along the side of the casket. The pivot hinges also ensure balanced and stable lifting of the side wall, without requiring the use of supports.

Moreover, the legs for resting on the ground, hinged under the base of the casket, can be used reversibly, i.e. they are movable between an operating position rotated downward and a folded position when not in use, without forming an obstruction during movement of the entire capsule.

BRIEF DESCRIPTION OF THE DRAWINGS

Further features and advantages of the invention will be more apparent from the more detailed description set forth below, with the aid of the drawings that show a preferred embodiment thereof, illustrated by way of non-limiting example, wherein:

FIGS. 1 and 2 show, respectively in a cross section and in an axonometric view, a funerary capsule for viewing and transporting dead bodies in open position, according to the prior art;

FIGS. 5, 6, and 7 show, in a top, front and side plan view, the funerary capsule in closed position;

DETAILED DESCRIPTION OF A PREFERRED EMBODIMENT OF THE INVENTION

Figure 4:
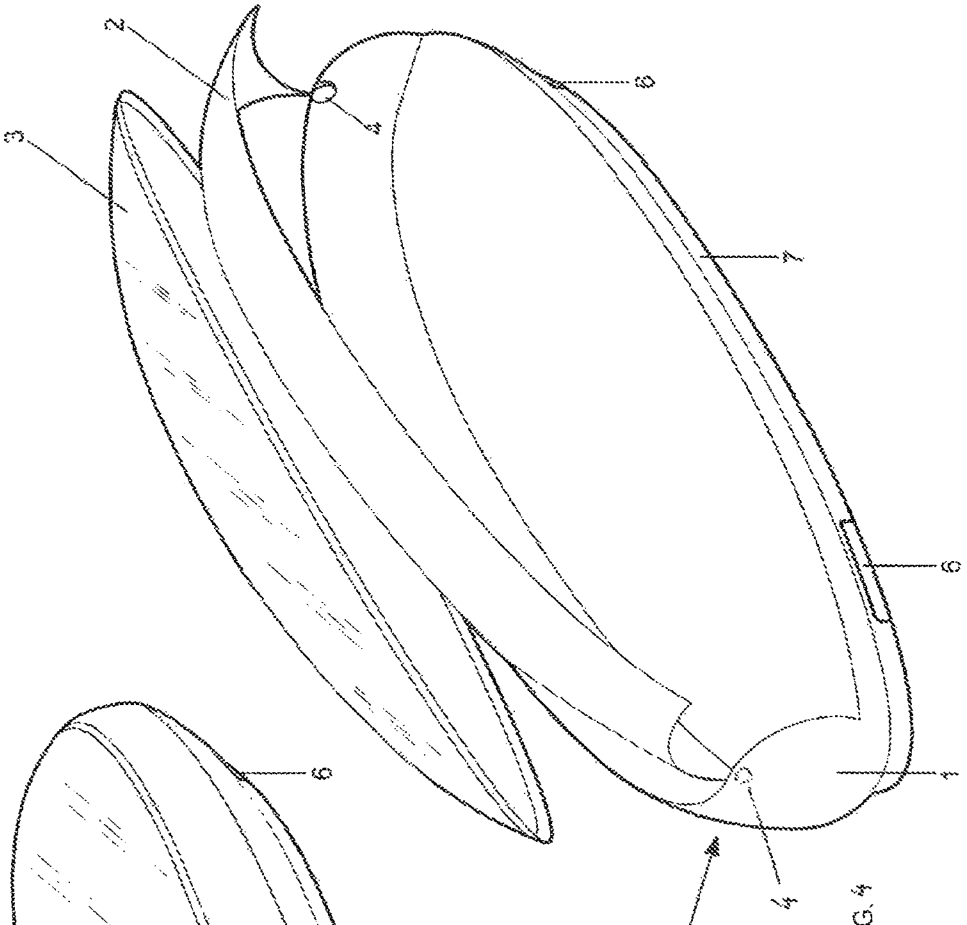
FIGS. 3-4 show, in a complete axonometric view, a funerary capsule for viewing and transporting dead bodies in closed and open position, according to the invention.
Figure 3:
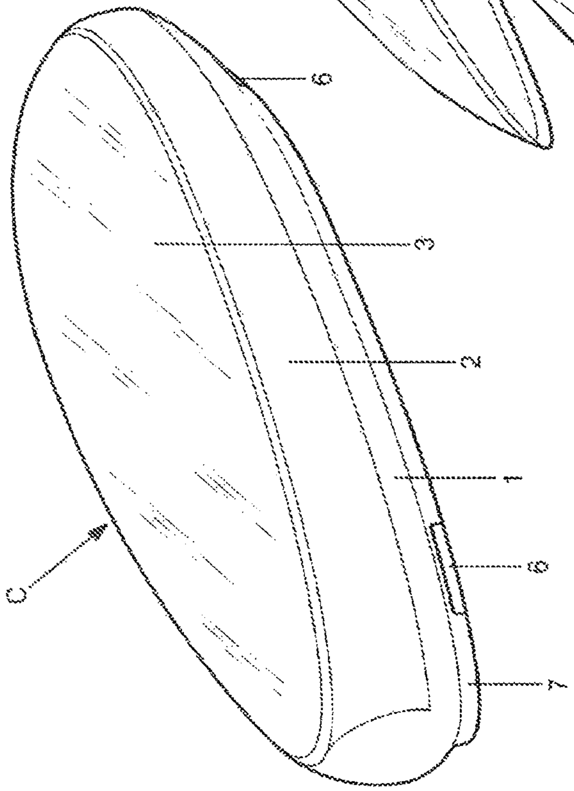
Figure 8:
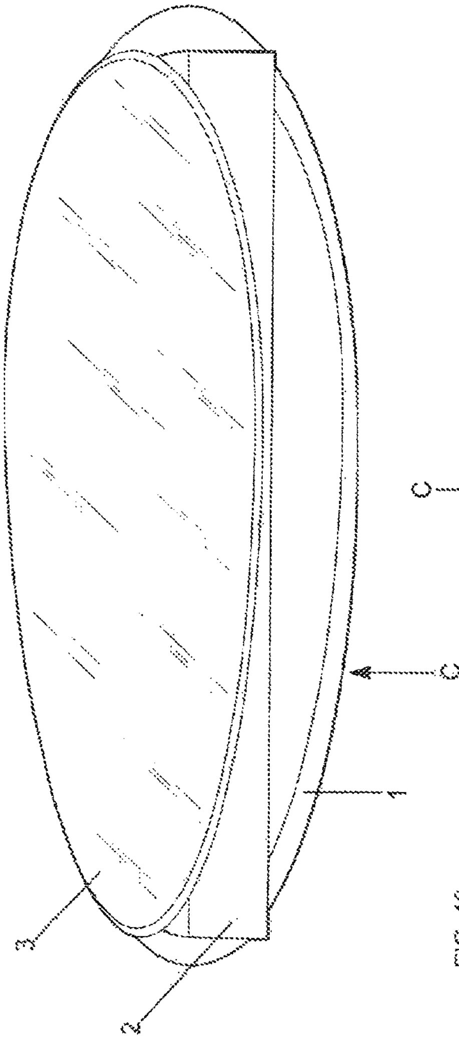
FIGS. 8, 9, and 10 show, in a top, front and side plan view, the funerary capsule in open position.
Figure 10:
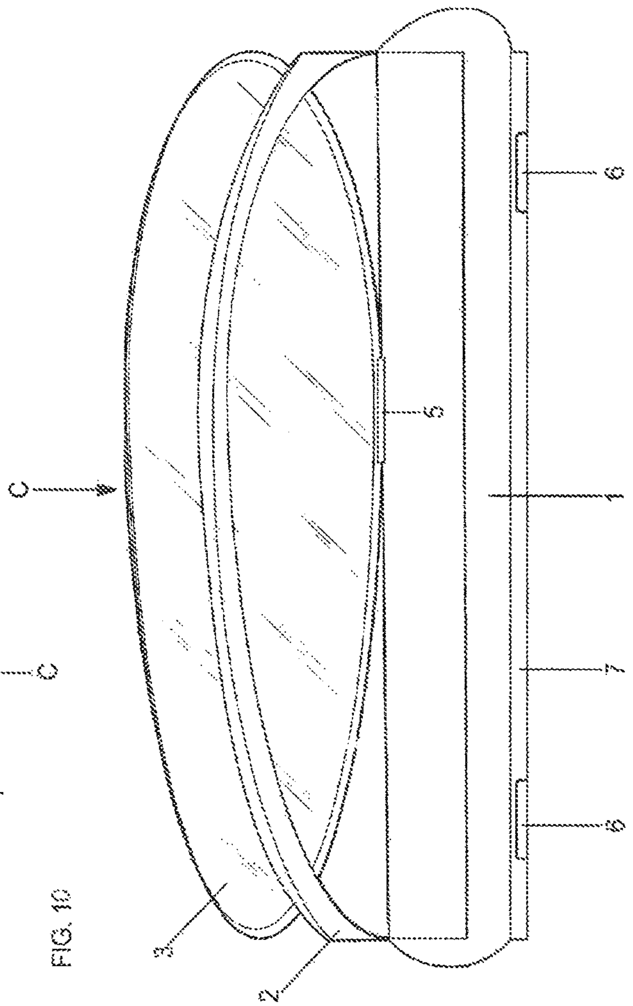
Figure 9:
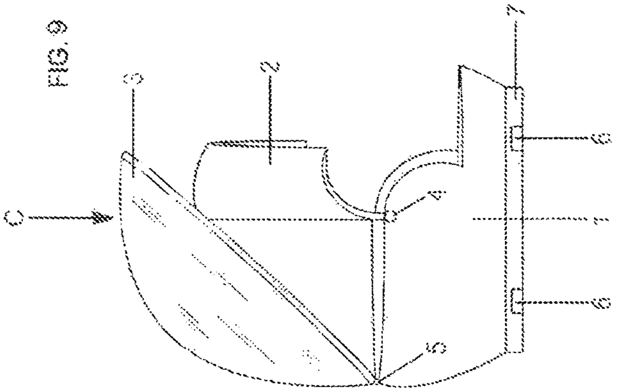
Figure 11:
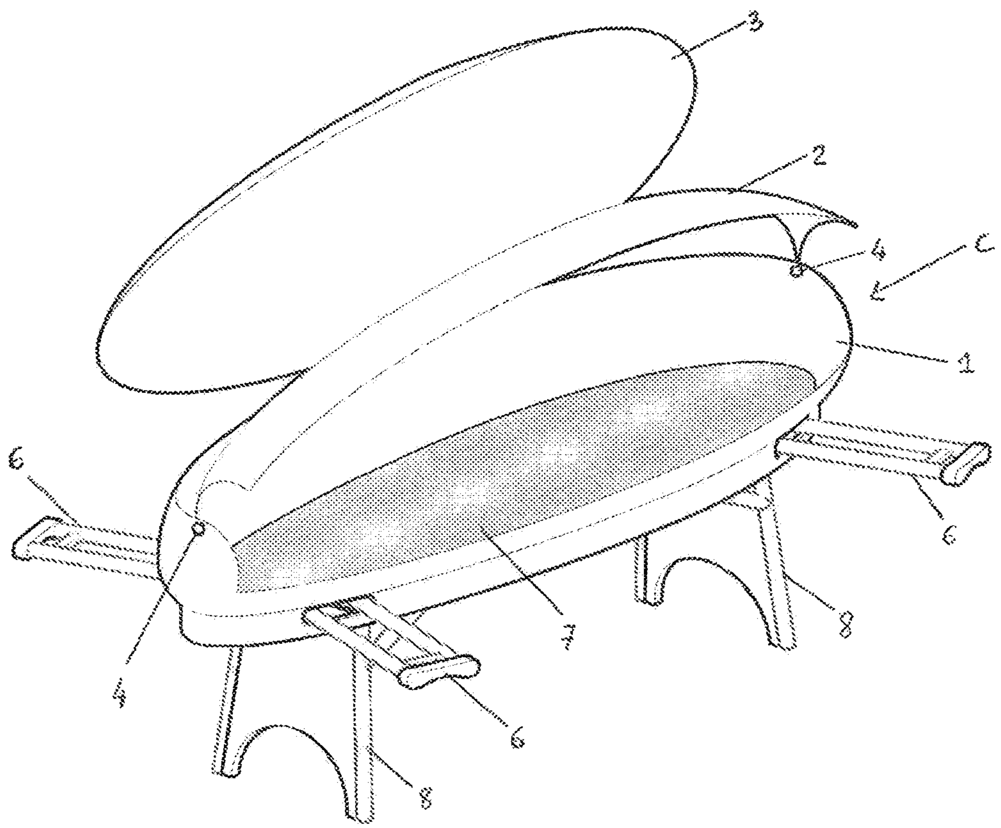
FIG. 11 shows, in a complete axonometric view, the funerary capsule in open position and resting on the ground, according to the invention.

With reference to the details of FIGS. 3-11, a funerary capsule C for viewing and transporting dead bodies to cremation sites according to the invention comprises:

- a casket 1 for containing the body, provided with a side wall 2 and a lid 3 liftable by rotation on respective hinges 4, 5 relative to the remaining stationary portion of said casket 1;
- a bag (not illustrated) for containing the body, which can be placed in said casket 1, provided with handles and closing ties;
- handles 6, which can be extracted laterally from the base 7 of said casket 1;
- legs 8 for resting on the ground, which can be folded and housed under the base 7 of said casket.

The casket 1, the side wall 2 and the lid 3 of the capsule C are made of synthetic materials of known and suitable type, adapted to be subjected to sanitation processes that ensure the hygiene of the capsule C and allow its reuse without health risks for the funeral operators.

The casket 1 and the side wall 2 of the capsule C are made of opaque synthetic materials, while the lid 3 of the capsule C is made of transparent synthetic materials, adapted to allow viewing of the body contained therein. For religions that do not allow viewing of the body, said lid 3 is instead made of opaque material.

The bag for containing the body, the related handles and the related closing ties, are made of natural fibers, suitable to be incinerated during cremation of the body.

Naturally, bag must be understood as any enclosure made of fabric, such as a veil, shroud, etc., used in different countries around the world according to religious or civil customs.

Moreover, the closing ties can comprise closing means of Velcro® or zip fastener type.

The hinges 4 for lifting the side wall 2 of the capsule C are advantageously of pivot type: said hinges 4 are two and are provided symmetrically at the two end points of the casket 1, so as to facilitate the upward rotation of the side wall 2 and allow easy and direct access to the bag containing the body. The body can be extracted from the capsule C by simply being pulled horizontally, without requiring lifting or particular precautionary measures.

Advantageously, said hinges 4 are of the type with adjustable friction.

The hinge 5 for lifting the lid 3 of the capsule C is preferably of rectilinear type.

Said legs 8 for resting the coffin on the ground are provided with hinges (not illustrated) adapted to allow the rotation thereof between a position of use resting on the ground (FIG. 11) and an idle position folded under said base 7 (FIGS. 3-10).

In more complex possible variants of embodiment (not illustrated), the funerary capsule C can also comprise:

- a system for cooling the body, housed in the base of the casket 1;
- a system for lighting the body, arranged in the upper profile of the casket 1 and/or of the related liftable side wall 2.

The use of a funerary capsule C for viewing and transporting dead bodies, for example to cremation sites or sites of worship (such as mosques in the case of Muslims), according to the invention, can be summarized as described below.

The dead body is laid out inside the appropriate bag for containing it and with it inserted into the casket 1 of the funerary capsule C, supported by appropriate legs 8 for resting on the ground.

The movement of the body is facilitated by the handles arranged on the bag, while its insertion into the casket 1 of the funerary capsule C is facilitated by temporarily lifting the related side wall 2 and the related closing lid 3 on the respective rotation hinges 4, 5.

After the body has been inserted into the casket 1 of the funerary capsule C, and after having re-opened the bag containing it, the related side wall 2 and the related lid 3 are returned to the initial lowered position, in this case determining closing thereof and arrangement (with the legs 8 folded under the casket 1) for transporting the body to the viewing site (mortuary, place in which the funeral is to be held, etc.) or cremation site chosen.

The movement of the funerary capsule C is facilitated by the extractable handles 6, arranged on the base 7 of the casket 1 for containing the body.

At the viewing site, the dead body will be visible through the transparent lid 3 of the casket 1 of the funerary capsule C, while the bag will perform the function of lining for covering and/or decorating the casket 1 of the funerary capsule C.

At the cremation site, the dead body will be extracted from the casket 1 of the funerary capsule C after being closed inside the bag again and loaded with the bag into the crematory used for its incineration.

Extraction of the body from the casket 1 of the funerary capsule C is facilitated by the handles provided on the bag and by temporary lifting of the related side wall 2 and of the related closing lid 3 on the respective rotation hinges 4, 5, while closing of the bag is enabled by appropriate ties arranged thereon.

Only the bag for containing the body, the related handles, and the related closing ties will be incinerated during cremation of the body, thereby allowing a reduction in atmospheric pollution produced by cremation services, mainly due to the energy consumption and atmospheric emissions deriving from the incineration of coffins for traditional cremations.

After having performed its service, the funerary capsule will instead be subjected to sanitation treatments, which will allow it to be reused, in this way allowing a reduction in the operating costs of the cremation services, mainly determined by the single use of coffins for traditional cremations.

In more complex possible variants of embodiment (not illustrated), the funerary capsule C can also comprise a system for cooling the body, arranged in the base 7 of the casket 1, or a system for lighting the body, arranged in the upper profile of the casket 1 and/or of the related liftable side wall 2.

The invention claimed is:

1. A funerary capsule (C) for viewing and transporting a dead body, comprising:

- a casket (1) for containing the body, provided with a side wall (2), a base (7), and a closing lid (3); and a bag for containing the body to be placed in said casket (1), said casket (1) comprising first hinge means (4) for said side wall (2), and second hinge means (5) for said lid (3) adapted to allow the movement thereof by rotation, wherein said first hinge means (4) comprise first and second pivot hinges respectively mounted on opposing first and second surfaces of the casket (1), configured to allow reversible lifting of the side wall (2) from a closed position to an open position.

2. The funerary capsule (C) according to claim 1, wherein the casket (1), the side wall (2) and the closing lid (3) are made of synthetic materials adapted to be subjected to sanitation treatments.

3. The funerary capsule (C) according to claim 2, wherein the closing lid (3) is made of a transparent material.

4. The funerary capsule (C) according to claim 1, wherein the bag for containing the body, is made of natural fibers adapted to be incinerated during cremation of the body.

5. The funerary capsule (C) according to claim 1, wherein said second hinge means (5) comprise a linear rotation hinge that allows reversible lifting of the closing lid (3).

6. The funerary capsule (C) according to claim 1, wherein the casket (1) comprises handles (6) that are extractable laterally from the base (7).

7. The funerary capsule (C) according to claim 1, wherein the casket (1) comprises legs (8) for resting on the ground, which are housed under the base (7) and provided with hinges adapted to allow rotation thereof between a using position resting on the ground and an idle position folded under said base (7).

* * * * *